(12) United States Patent
Kim

(10) Patent No.: US 8,127,390 B2
(45) Date of Patent: Mar. 6, 2012

(54) ROBOT FOR CLEANING WALL/WINDOW

(76) Inventor: Yong Wook Kim, Hwaseong (KR)

( * ) Notice: Subject to any disclaimer, the term of this patent is extended or adjusted under 35 U.S.C. 154(b) by 1067 days.

(21) Appl. No.: 12/025,166

(22) Filed: Feb. 4, 2008

(65) Prior Publication Data

US 2008/0195253 A1 Aug. 14, 2008

(30) Foreign Application Priority Data

Feb. 9, 2007 (KR) .................. 10-2007-0014014

(51) Int. Cl.
*G05D 1/00* (2006.01)
*B25J 9/00* (2006.01)

(52) U.S. Cl. ............... 15/50.1; 15/103; 700/245; 901/1; 901/30; 901/40; 901/46

(58) Field of Classification Search ............ 15/50.1, 15/103; 700/245; 901/1, 46, 30, 40
See application file for complete search history.

(56) References Cited

U.S. PATENT DOCUMENTS

| 5,655,247 | A | * | 8/1997 | Allen et al. | 15/103 |
| 2006/0143845 | A1 | * | 7/2006 | Miyake et al. | 15/103 |
| 2008/0134458 | A1 | * | 6/2008 | Ziegler et al. | 15/320 |

* cited by examiner

*Primary Examiner* — Monica Carter
*Assistant Examiner* — Stephanie Newton
(74) *Attorney, Agent, or Firm* — Edwards Wildman Palmer LLP

(57) ABSTRACT

A robot according to the present invention cleans the outer surface of a window/wall by performing automatic movement along the outer surface of the window/wall while being vacuum-sucked onto the outer surface. The robot includes a moving unit for moving the robot in a first direction, a direction changing unit for rotating the moving unit to change a movement direction of the robot, and a cleaning unit mounted on at least one side of the robot. The robot can prevent water used to clean the window or outer wall of a building from being dropped toward a lower story. Also, the robot can run smoothly so that it can achieve a satisfactory cleaning operation without forming spots. The robot uses a turntable system, so that it can also freely change the movement direction thereof about the center thereof up to 360° without requiring any radius of rotation, to easily approach even a dead zone. The robot has a minimum size and a minimum weight, so that it can minimize the possibility that the robot falls down during a cleaning operation.

21 Claims, 8 Drawing Sheets

ROBOT FOR CLEANING WALL/WINDOW

CROSS-REFERENCE TO RELATED APPLICATION

This application claims the benefit of Korean Patent Application No. 10-2007-0014014 filed on Feb. 9, 2007, the entire contents of which are incorporated herein by reference.

TECHNICAL FIELD

The present invention relates to a wall/window cleaning robot, and more particularly to a wall/window cleaning robot for cleaning the surface of a wall or window by performing automated movement along the surface while being vacuum-sucked onto the surface.

BACKGROUND ART

Although numerous buildings having glass windows and smooth walls have been constructed for several ten or hundred years, no or less intensive research has been made for developing a method for efficiently cleaning such glass windows and smooth walls. For this reason, cleaning of glass windows and smooth walls has been done using manual labor.

It, however, involves many problems. For example, it is time consuming and exposes a person who performs such cleaning task to a danger of falling. In particular, in case of cleaning a window of an apartment building, water used in the cleaning may flow downwards, thereby causing the water to soil the outer surfaces of windows on the lower stories.

To solve the above-mentioned problems, wall/window cleaning robots have been proposed, for example, in Korean Utility Model Registration No. 20-0265415 and Korean Patent No. 10-0632260.

The prior art wall/window cleaning robots, however, still do not solve the above-mentioned problems; for instance, water used in a cleaning operation may flow downwards. Furthermore, they are so large and heavy that they can be separated from an outer wall/window during cleaning operation. That is, they cannot freely move along the outer surface of a window or outer wall while being stably vacuum-sucked onto the outer surface. More seriously, they have a structure that necessarily stops the movement intermittently, thereby leaving undesirable spots after the cleaning operation is completed. Moreover, they cannot clean a dead zone of the outer wall/window because they need too large a radius of rotation to change their movement direction, resulting in unsatisfactory cleaning. For various reasons including the above-mentioned problems, no prior art cleaning robots have been successfully practically applied.

The above information disclosed in this Background Art section is only for enhancement of understanding of the background of the invention and therefore it may contain information that does not form the prior art that is already known in this country to a person of ordinary skill in the art.

SUMMARY OF THE DISCLOSURE

The present invention has been made in view of the above-mentioned problems, and an object of the invention is to provide a wall/window cleaning robot that can prevent water used to clean the window or wall from being dropped toward a lower story.

Another object of the invention is to provide a wall/window cleaning robot that can run smoothly to achieve a satisfactory cleaning operation without forming spots.

Still another object of the invention is to provide a wall/window cleaning robot that can freely change movement direction thereof about the center thereof up to 360° without requiring any radius of rotation to be able to easily approach even a dead zone, thereby achieving a perfect cleaning operation.

A further object of the invention is to provide a wall/window cleaning robot which minimizes a possibility that the cleaning robot falls off and down during a cleaning operation.

In one aspect, the present invention provides a robot for cleaning a wall and/or window, comprising: a moving unit for moving the robot in a first direction; a direction changing unit for rotating the moving unit to change moving direction of the robot; and a cleaning unit mounted on peripheral area of the robot.

Other aspects of the invention are discussed infra.

BRIEF DESCRIPTION OF THE DRAWINGS

The above and other objects, features and other advantages of the present invention will be more clearly understood from the following detailed description taken in conjunction with the drawings, in which.

DETAILED DESCRIPTION

Now, preferred embodiments of a wall/window cleaning robot in accordance with the present invention will be described with reference to the accompanying drawings.

Figure 1:
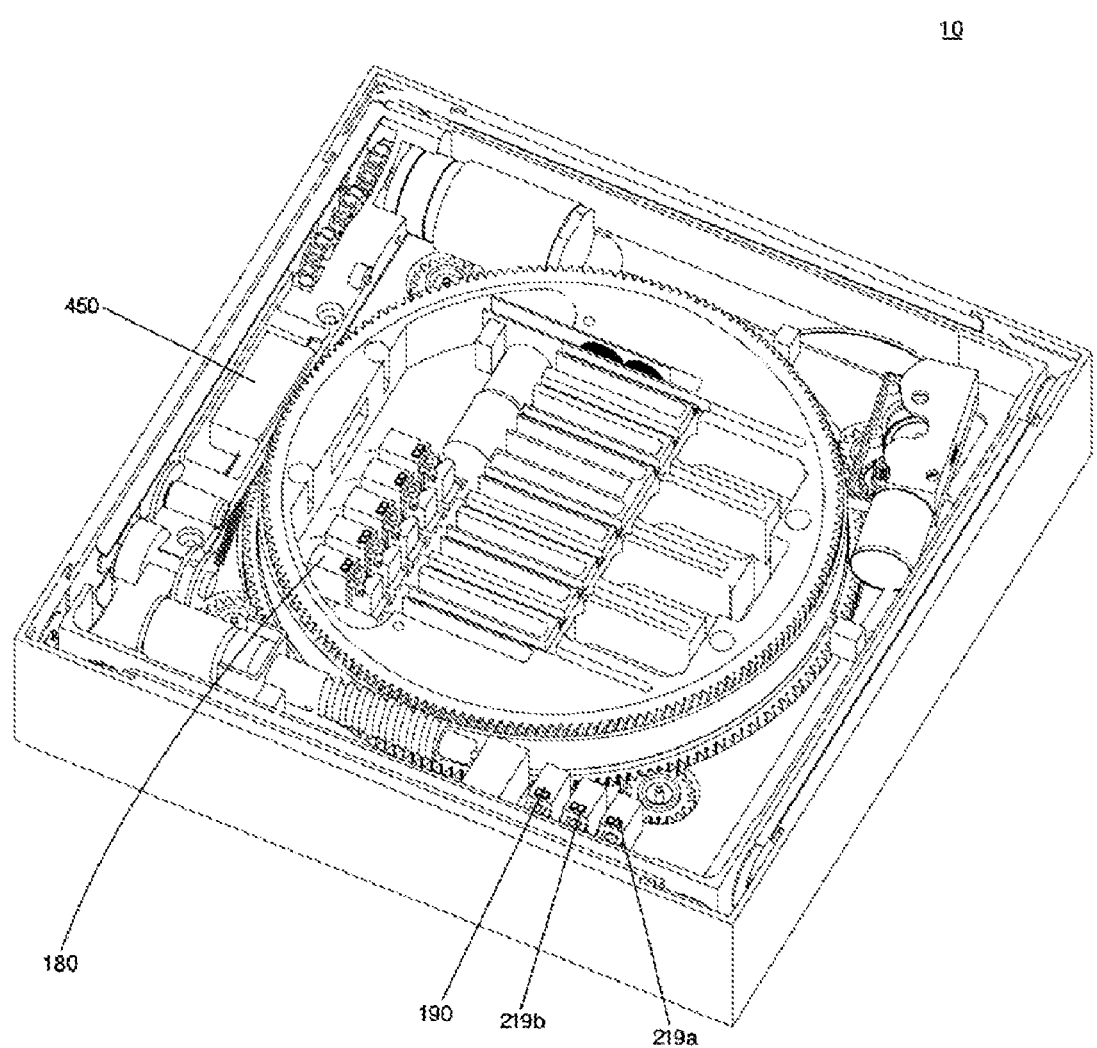
FIG. 1 is a perspective view illustrating the top of a cleaning robot according to a preferred embodiment of the present invention.
Figure 2:
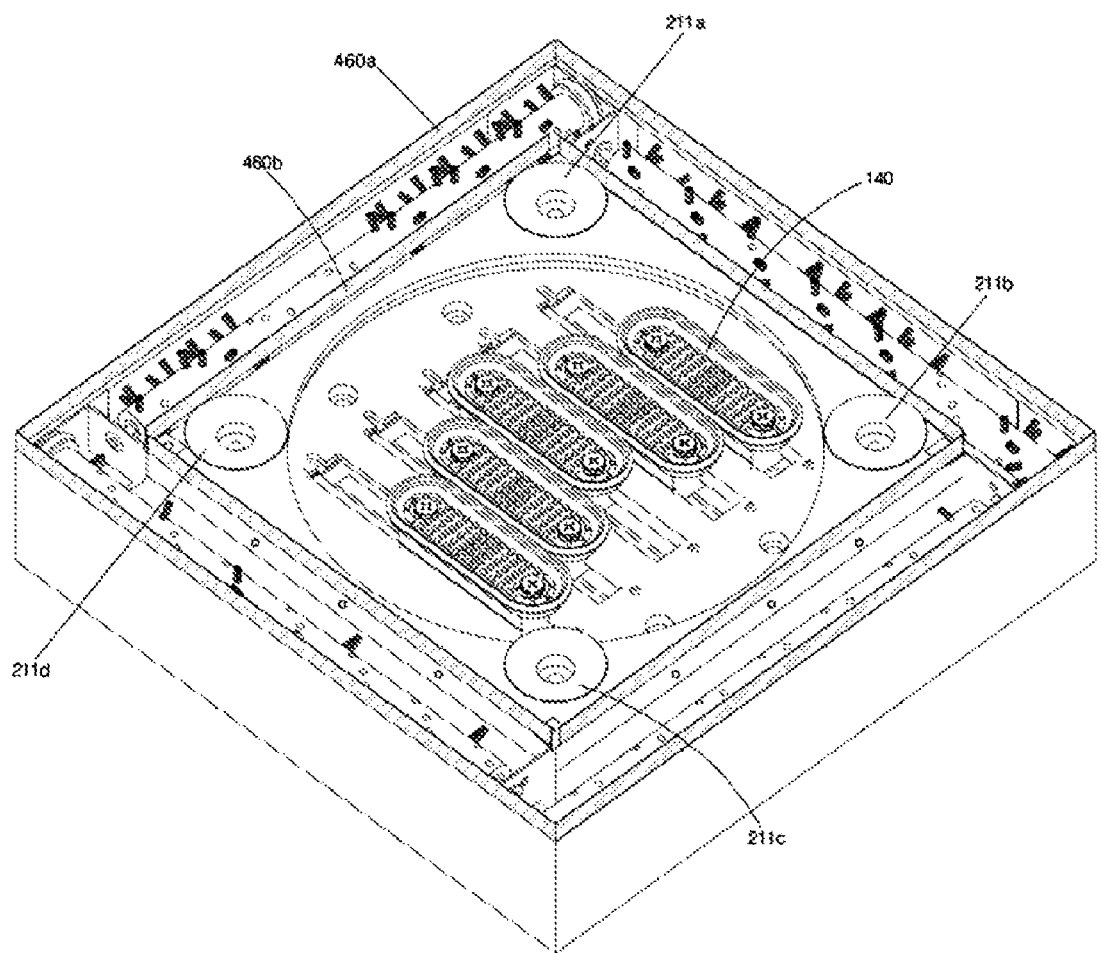
FIG. 2 is a perspective view illustrating the bottom of a cleaning robot according to a preferred embodiment of the present invention.

FIGS. 1 and 2 are perspective views respectively illustrating the top and bottom of the body of a cleaning robot according to a preferred embodiment of the present invention.

Figure 6:
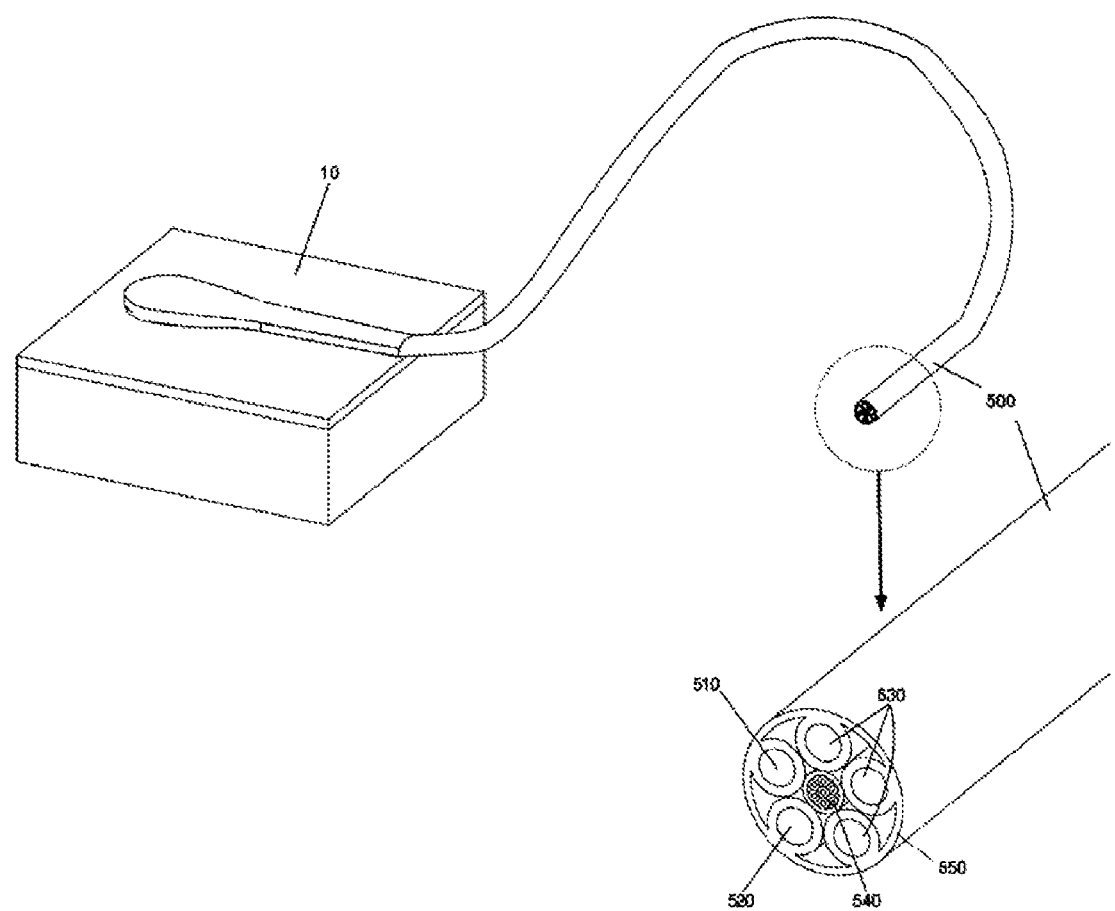
FIG. 6 is a perspective view illustrating the configuration of a multi-hose cable according to a preferred embodiment of the present invention.

The body 10 of the cleaning robot mainly includes a moving unit for moving the robot in a first direction, a direction changing unit for changing the movement direction of the robot, and a cleaning unit mounted on peripheral area of the body 10. The body 10 is connected to a multi-hose cable 500 (FIG. 6).

Hereinafter, the configuration and operation of the cleaning robot according to a preferred embodiment of the present invention will be described in conjunction with respective parts of the robot.

Figure 3A:
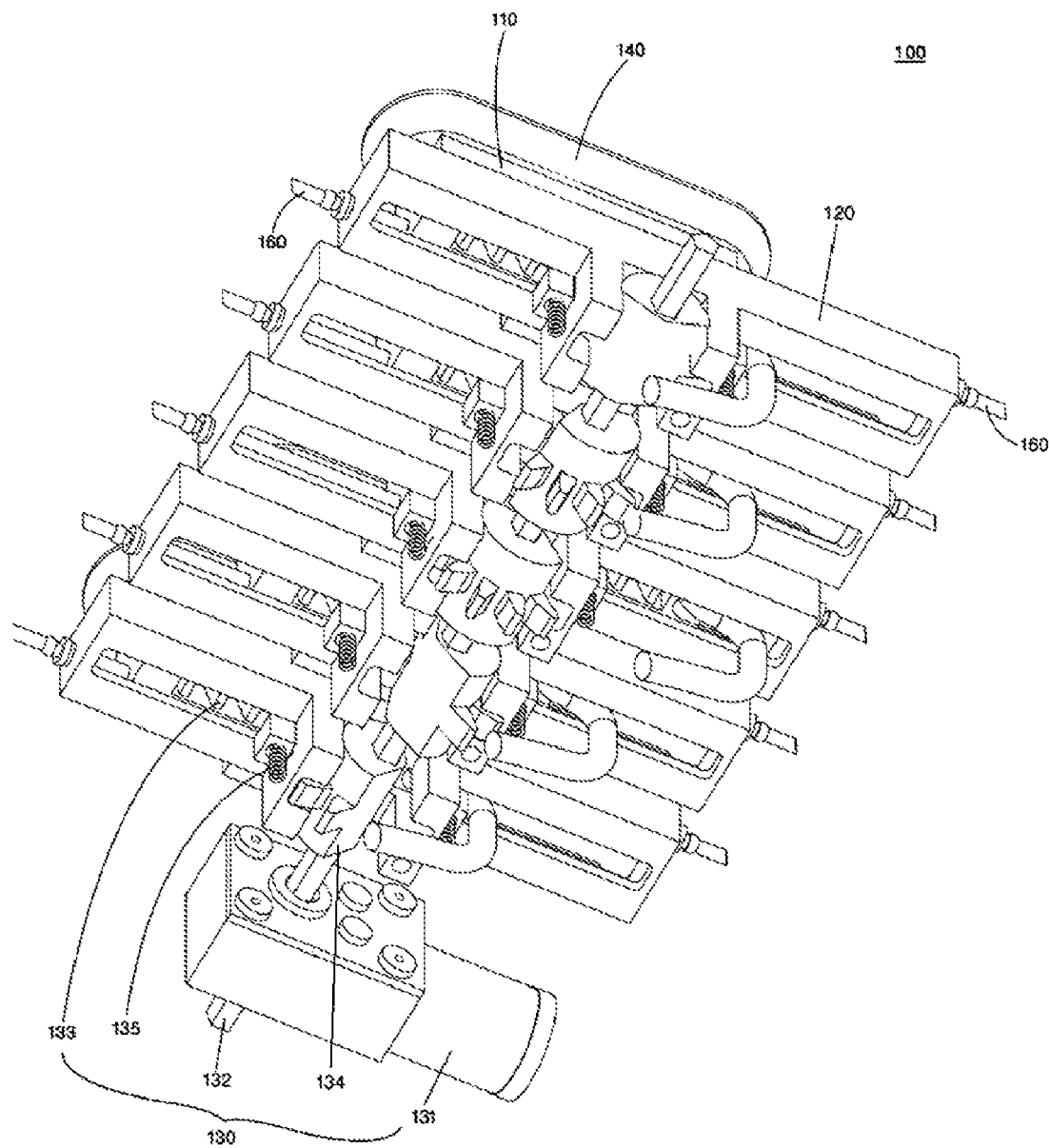
FIGS. 3A and 3B are perspective and exploded perspective views, respectively, of a moving unit according to a preferred embodiment of the present invention
Figure 3B:
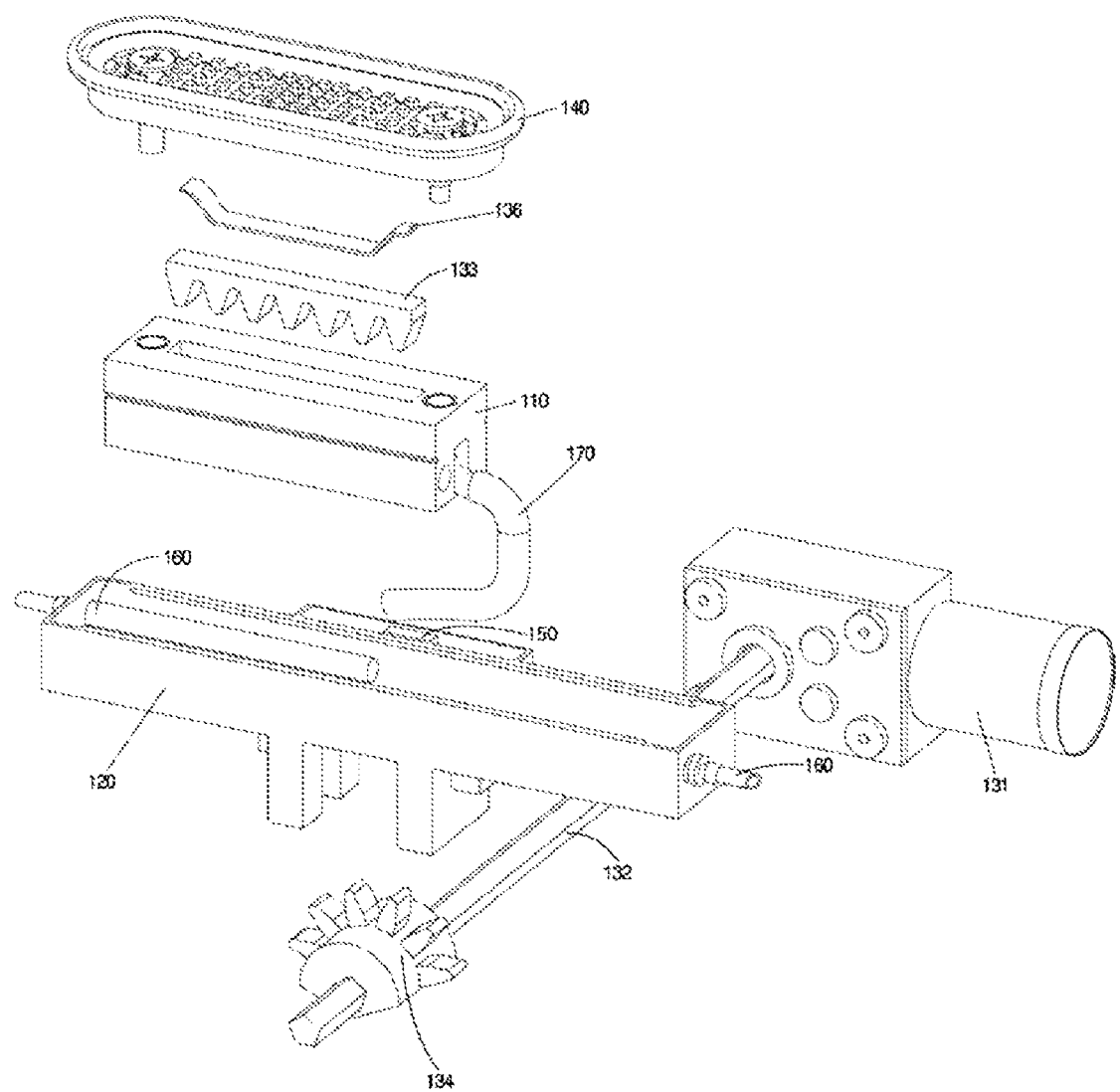

FIGS. 3A and 3B illustrate a moving unit according to a preferred embodiment of the present invention. FIG. 3A is a perspective view and FIG. 3B is an exploded perspective view of the moving unit.

The moving unit 100 includes a plurality of moving members. For example, it may include, as shown in FIGS. 3A and 3B, five moving members 110. These moving members can move linearly in a direction opposite to a running direction of the robot. The five moving members 110 are driven by a moving member driving unit 130. The linear movement of the five moving members 110 are guided by five moving member rails 120, respectively. A moving member sensor 150 is mounted on one side of each moving member rail 120, to sense a linear movement of the corresponding moving member 110. Moving member returning cylinders 160 are also mounted on each moving member rail 120, to instantaneously return the corresponding moving member 110 when the moving member 110 completes a linear movement by a predetermined distance. Each moving member returning cylinder 160 is actuated by a pneumatic solenoid valve 190 controlled by a controller (not shown). Although a pneumatic cylinder is used in this preferred embodiment, any known device can be used as long as it can perform the moving member returning function. An example of the device is a general coil spring.

The moving member returning cylinders 160 are mounted on opposite ends of each moving member rail 120, in order to enable the corresponding moving member 110 to return to an original position thereof in accordance with a control operation of the moving member driving unit 130 even when it moves linearly in any direction along the moving member rail 120. Accordingly, the cleaning robot can freely move in forward and backward directions, without having to rotate to change the movement direction thereof, only by a simple control operation of the moving member driving unit 130, or in more detail, a rotation direction control operation of a moving member driving motor 131.

The moving driving unit 130 includes the moving member driving motor 131. It also includes a shaft 132 rotatably connected to the motor 131, plate cam gears 134 operatively connected to the shaft 132 and rotating, and rack gears 133 mounted on respective moving members 110 and operatively connected to respective plate cam gears 134 and moving linearly.

In a preferred embodiment, the shaft 132 has a pentagonal cross-section because there are five moving members 110. However, the cross-section of the shaft 132 may vary in accordance with the number of the moving members 110. For example, when the number of the moving members 110 is "n", the shaft 132 may have an n-gonal cross-section. Also, when the number of the moving members 110 is "2n", the shaft 132 may have an n-gonal cross-section. On the other hand, when the number of the moving members 110 is "2n+1", the shaft 132 may have an "n+1"-gonal cross-section.

In accordance with another embodiment of the present invention, the shaft 132 may comprise separate shafts respectively fitted through the moving members 110. In this case, the shafts are connected to independent moving member driving motors, respectively. In accordance with this configuration, movement direction of the cleaning robot can be finely changed by controlling the rotating speeds of two of the moving member driving motors such that they are different from each other.

Each plate cam gear 134 has a sector shape formed by partially removing a circular shape. The geared portion of the plate cam gear 134 has an arc length corresponding to a length for which the corresponding moving member 110 moves linearly. The shaft 133 is fitted through the centers of curvature of the plate cam gears 134. Accordingly, when each moving member 110 starts to move linearly by the corresponding plate cam gear 134, the corresponding moving member rail 120 is downwardly moved toward an outer wall/window to be cleaned, by the plate cam of the plate cam gear 134. When the linear movement is completed, a space where there is no plate cam is present beneath the moving member rail 120, so that the moving member rail 120 is upwardly moved by a resilience of rail returning springs 135, to return to a position spaced apart from the outer wall/window. In accordance with this configuration, the movement member 110 moves linearly in a state of being moved toward the outer wall/window, and returns to an original position thereof by the corresponding movement member returning cylinders 160 in a state of being spaced apart from the outer wall/window, when the linear movement is completed.

Preferably, the five plate cam gears 134 are used to drive the five moving members 110. The times, at which the five moving members 110 pass through a certain line perpendicular to the linear paths of the moving members 110, respectively, can be set such that each time is different from one another, by arranging the five plate cam gears 134 such that each plate cam gear 134 is misaligned with one another by a certain angle, for example, 72° (360°÷5). It is preferred that, when it is assumed that the five moving members 110 are designated by a, b, c, d, and e from the left, the order of the moving members 110 passing through the line be "a→e→b→d→c". In accordance with this configuration, it is possible to ensure a more stable and smooth movement of the cleaning robot.

In order to support the cleaning robot onto the outer wall/window, moving vacuum pads 140, which are connected to a vacuum hose 170, are attached to the five moving members 110, respectively. A rack gear returning spring 136 is interposed between each vacuum pad 140 and the corresponding rack gear 133. The vacuum applied to each moving vacuum pad 140 is controlled by a moving member vacuum solenoid valve 180. Meanwhile, it is preferred that each moving vacuum pad 140 have an oval shape with its longer axis parallel to the linear movement direction of the moving vacuum pad 140. In this case, it is possible to efficiently use the space of the robot, and thus to minimize the size of the robot.

Hereinafter, operation of the moving unit 100, which has the above-described configuration according to the illustrated preferred embodiment of the present invention, will be described.

When a cleaning start button (not shown) of the cleaning robot is pressed, the moving member driving motor 131 starts to rotate in a first direction. In accordance with the rotation, the shaft 132 and the plate cam gears 134 fitted around the shaft 132 start to rotate. The rotation of each plate cam gear 134 causes the corresponding rack gear 133, moving member 110, and moving vacuum pad 140 to start to move linearly.

When the moving member 110 connected to the rack gear 133 starts to move linearly along the moving member rail 120, the moving member sensor 150 senses the movement, and sends a first sensing signal to the controller (not shown) until the moving member 110 reaches a predetermined position. In response to the first sensing signal from the moving member sensor 150, the controller controls the moving member vacuum solenoid valve 180 to apply a vacuum to the moving vacuum pad 140 mounted on the moving member 110 through the vacuum hose 170. Thus, vacuum is always applied to the moving vacuum pad 140 during a linear movement of the moving member 110.

When the linear movement of the moving member 110 is completed as the moving member reaches the predetermined position (at this time, the last tooth of the sector-shaped plate cam gear 134 is separated from the rack gear 133), the controller controls the moving member vacuum solenoid valve 180 to release the vacuum from the moving vacuum pad 140.

At the same time, the controller controls the pneumatic solenoid valve 180 to apply a pneumatic pressure to the moving member 110 through the moving member returning cylinder 160 mounted on the moving member rail 120, and thus to instantaneously return the moving member 110 to the original position thereof.

When the moving member 110 starts to move linearly from the initial position thereof by the plate cam gear 134, the moving member rail 120 is downwardly moved toward the outer wall by the plate cam gear 134. When the linear movement of the moving member 110 is completed, i.e., the moving member 110 reaches the predetermined position, the plate cam ceases to support the moving member rail 120 due to its own shape, and the moving member rail 120 is spaced apart from the outer wall/window as the moving member rail 120 is upwardly moved by a resilience of the rail returning spring 135. Thus, the moving member 110 linearly moves while it is in contact with the outer wall/window, and returns to the original position when the moving member rail 120 is spaced apart from the outer wall/window.

Since the five plate cam gears 134, which have a sector shape, are arranged such that each plate cam gear 134 is misaligned with one another by 72° (360°÷5), each of the times, at which the five moving members 110 pass through a certain line perpendicular to the linear paths of the moving members 110, respectively, is different from one another. In accordance with the illustrated preferred embodiment of the present invention, the order of the moving members 110 passing through the line is "a→e→b→d→c" assuming that the five moving members 110 are designated as a, b, c, d, and e from the left.

As described above, the cleaning robot of the preferred embodiment of the present invention includes the direction changing unit which rotates the moving unit 100 to change the moving direction of the robot. The direction changing unit includes a position fixing unit 200 for fixing the robot to the outer wall/window, and a direction setting unit 300 for rotating the moving unit 100 while the robot is fixed to the outer wall/window by the position fixing unit 200.

Hereinafter, the configuration and operation of the direction changing unit according to the present invention will be described in detail.

Figure 4A:
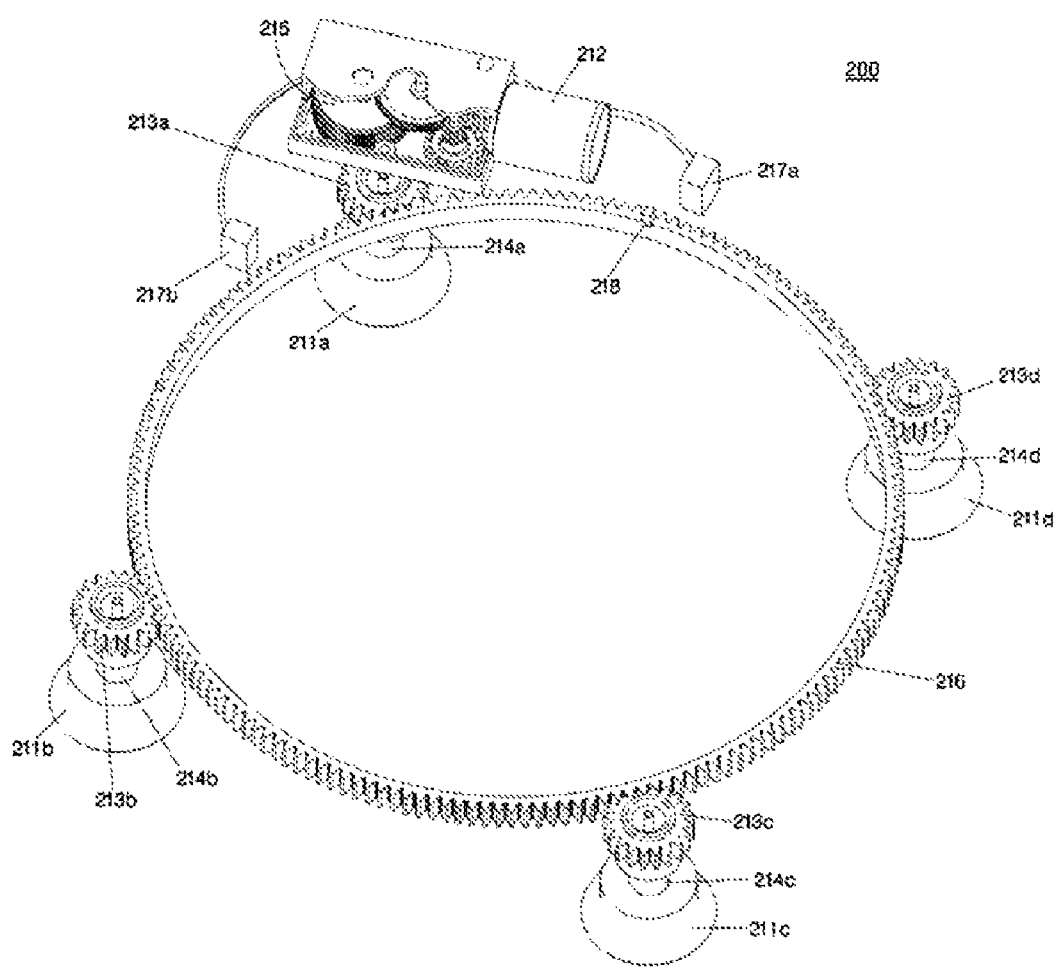
FIG. 4A is a perspective view illustrating the configuration of a position fixing unit according to a preferred embodiment of the present invention.
Figure 4B:
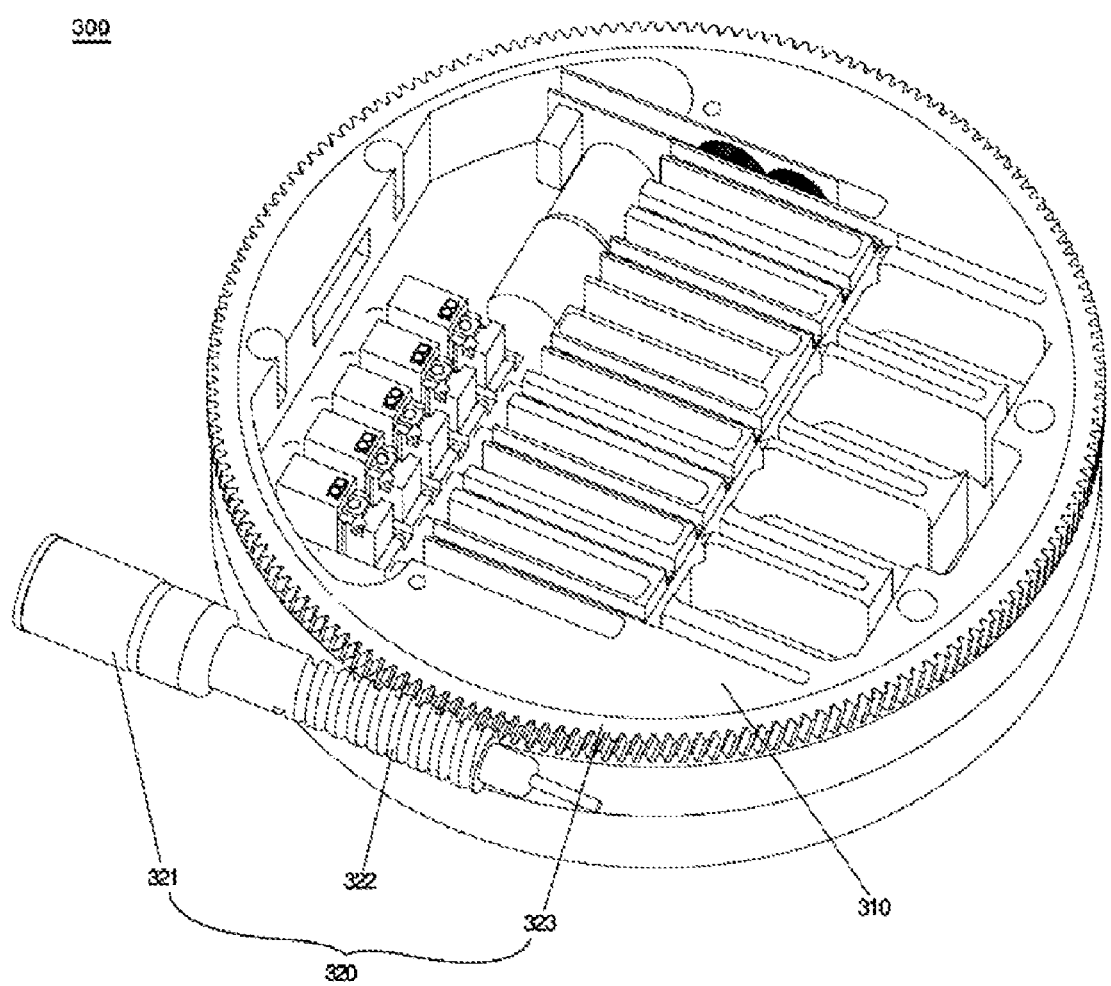
FIG. 4B is a perspective view illustrating the configuration of a direction setting unit according to a preferred embodiment of the present invention.

FIGS. 4A and 4B are perspective views illustrating the configurations of the position fixing unit and direction setting unit according to the present invention, respectively.

In accordance with a preferred embodiment of the present invention, the position fixing unit 200 includes position-fixing vacuum pads 211a to 211d to be attached onto the outer wall. The position-fixing vacuum pads 211a to 211d are vertically movable with respect to the outer wall by a position-fixing driving unit.

The position-fixing driving unit includes a position-fixing drive motor 212, a first female spur gear 213a, which rotates by the position-fixing drive motor 212, and a first vertical screw gear 214a, which moves linearly in accordance with the rotation of the first female spur gear 213a. A rotary damper gear 215 is arranged between the position-fixing drive motor 212 and the first female spur gear 213a, in order to transmit a rotating force from the position-fixing drive motor 212 to the first female spur gear 213a while preventing the position-fixing drive motor 212 from being overloaded.

A driven spur gear 216 is operatively connected to the first female spur gear 213a while being arranged on the same plane as the first female spur gear 213a, such that the driven spur gear 216 is rotated by the first female spur gear 213a. Female spur gears 213b to 213d are operatively connected to the driven spur gear 216 such that they are rotated by the driven spur gear 216. Vertical screw gears 214b to 214d are coupled with the female spur gears 213b to 213d such that they are linearly moved in accordance with the rotations of the female spur gears 213b to 213d, respectively. Thus, four vertical screw gears 214a to 214d can move linearly in a vertical direction in a simultaneous manner by one position-fixing drive motor 212. The position-fixing driving unit further includes a downward movement limit 217a, an upward movement limit 217b, and a limit sensor 218 for sensing the downward movement limit 217a and upward movement limit 217b, in order to control the range of vertical linear movement of the vertical screw gears 214a to 214d.

Each of the position-fixing vacuum pads 211a to 211d is mounted on one end of an corresponding one of the vertical screw gears 214a to 214d.

Meanwhile, preferably, the direction setting unit 300, which functions to rotate the moving unit 100 in a state in which the robot is fixed to the outer wall by the position fixing unit 200, includes a moving unit supporting member 310 for supporting the moving unit 100, and a direction-setting driving unit 320 for rotating the moving unit supporting member 310.

The direction-setting driving unit 320 includes a direction-setting drive motor 321, a worm 322, which rotates by the direction-setting drive motor 321, and a worm gear 323 operatively connected to the worm 322 such that the worm gear 323 rotates by the worm 322. The worm gear 323 is fixed to an outer circumferential surface of the moving unit supporting member 310. Thus, in accordance with the rotation of the worm gear 323, the moving unit supporting member 310 and moving unit 100 rotate in the same direction as the worm gear 323.

Hereinafter, operation of the direction changing unit having the above-described configuration according the illustrated preferred embodiment of the present invention will be described.

When it is necessary to change the movement direction of the cleaning robot during a cleaning operation of the robot (for example, when an obstacle is sensed by a sensor attached to the outer surface of the body 10), the controller controls the moving member driving motor 131 to stop the rotation thereof, thereby stopping the movement of the robot.

Thereafter, the controller controls the position-setting drive motor 212 to rotate in a first rotation direction. The rotating force from the position-fixing drive motor 212 is transmitted to the first female spur gear 213a via the rotary damper gear 215, thereby causing the first female spur gear 213a to rotate. In accordance with the rotation of the first female spur gear 213a, the first vertical screw gear 214a and the first position-setting vacuum pad 211a mounted on the first vertical screw gear 214a are downwardly moved toward the outer wall/window.

As the first female spur gear 213a rotates, the driven spur gear 216, which is arranged on the same plane as the first female spur gear 213a, and the remaining female spur gears 213b to 213d, rotate simultaneously in accordance with the operative connected to the first female spur gear 213a. As the female spur gears 213b to 213d rotate, the vertical screw gears 214b to 214d and the position-fixing vacuum pads 211b to 211d mounted on the vertical screw gears 124b to 214d are downwardly moved toward the outer wall/window. Thus, the four position-setting vacuum pads 211a to 211d move linearly in the same direction in a simultaneous manner by one position-fixing drive motor 212.

Meanwhile, the controller controls a position fixing unit vacuum solenoid valve 219, simultaneously with the control to rotate the position fixing unit drive motor 212, to apply a vacuum to the four position-fixing vacuum pads 211a to 211d, and thus to enable the position-fixing vacuum pads 211a to 211d to be vacuum-sucked onto the outer wall/window. This control operation may be carried out just before or after the rotation of the position-fixing drive motor 212. In this case, since the moving vacuum pads 140 have been maintained in a state of being vacuum-sucked onto the outer wall/window, a force balance is established between the position-fixing vacuum pads 211a to 211d and the moving vacuum pads 140. As a result, the position-fixing pads 211a to 211d cannot be further downwardly moved toward the outer wall/window. At this time, the rotary damper gear 215 does not transmit the rotating force from the position-fixing drive motor 212 to the first female spur gear 213a, while allowing the rotation of the position-fixing drive motor 212, thereby preventing the position-fixing drive motor 212 from being overloaded.

When a force balance is established between the position-fixing vacuum pads 211a to 211d and the moving vacuum pads 140, the controller controls a moving unit vacuum main solenoid valve (hereinafter, referred to as a "main solenoid valve") 219a, to release the vacuum to all moving vacuum pads 140, and thus to release the force balance. As the force balance is released, the position-fixing vacuum pads 211a to 211d are again downwardly moved toward the outer wall/window. At this time, the moving vacuum pads 140 are simultaneously spaced apart from the outer wall/window. Meanwhile, when the limit sensor 218 senses the downward movement limit 217b, the controller stops the downward movement of the position-fixing vacuum pads 211a to 211d. Accordingly, the cleaning robot is vacuum-sucked onto the outer wall/window, only by the position-fixing vacuum pads 211a to 211d.

Thereafter, the controller controls the direction-setting drive motor 321 to rotate, thereby causing the worm 322 to rotate. In accordance with the rotation of the worm 322, the worm gear 323 rotates. As the worm gear 323 rotates, the moving unit supporting member 310 and moving unit 100 are rotated by a predetermined angle.

After the rotation of the moving unit 100 by the predetermined angle, the controller controls the position-fixing drive motor 212 to rotate in a second rotation direction, thereby causing the four position-fixing vacuum pads 211a to 211d to be upwardly moved in a direction opposite to the outer wall/window in a simultaneous manner.

Meanwhile, the controller controls the main solenoid valve 219a, simultaneously with the control to rotate the position fixing unit drive motor 212, to apply a vacuum to all moving vacuum pads 140. This control operation may be carried out just before or after the rotation of the position-fixing drive motor 212. In this case, the position-fixing vacuum pads 211a to 211d are upwardly moved under the condition in which the position-fixing vacuum pads 211a to 211d and the moving vacuum pads 140 are simultaneously vacuum-sucked onto the outer wall/window. When a force balance is established between the position-fixing vacuum pads 211a to 211d and the moving vacuum pads 140 during the upward movement of the position-fixing vacuum pads 211a to 211d, the rotary damper gear 215 does not transmit the rotating force from the position-fixing drive motor 212 to the first female spur gear 213a, while allowing the rotation of the position-fixing drive motor 212, thereby preventing the position-fixing drive motor 212 to be overloaded.

When a force balance is established between the position-fixing vacuum pads 211a to 211d and the moving vacuum pads 140, the controller controls the position fixing unit vacuum solenoid valve 219b, to release the vacuum to the four position-fixing vacuum pads 211a to 211d, and thus to release the force balance. As the force balance is released, only the moving vacuum pads 140 are in a state of being vacuum-sucked onto the outer wall/window.

When the force balance is released, as described above, the position-fixing vacuum pads 211a to 211d are again upwardly moved in a direction opposite to the outer wall/window, so that they are spaced apart from the outer wall/window. When the limit sensor 218 senses the upward movement limit 217a, the controller stops the upward movement of the position-fixing vacuum pads 211a to 211d. Thus, the direction change of the cleaning robot is completed.

Figure 5:
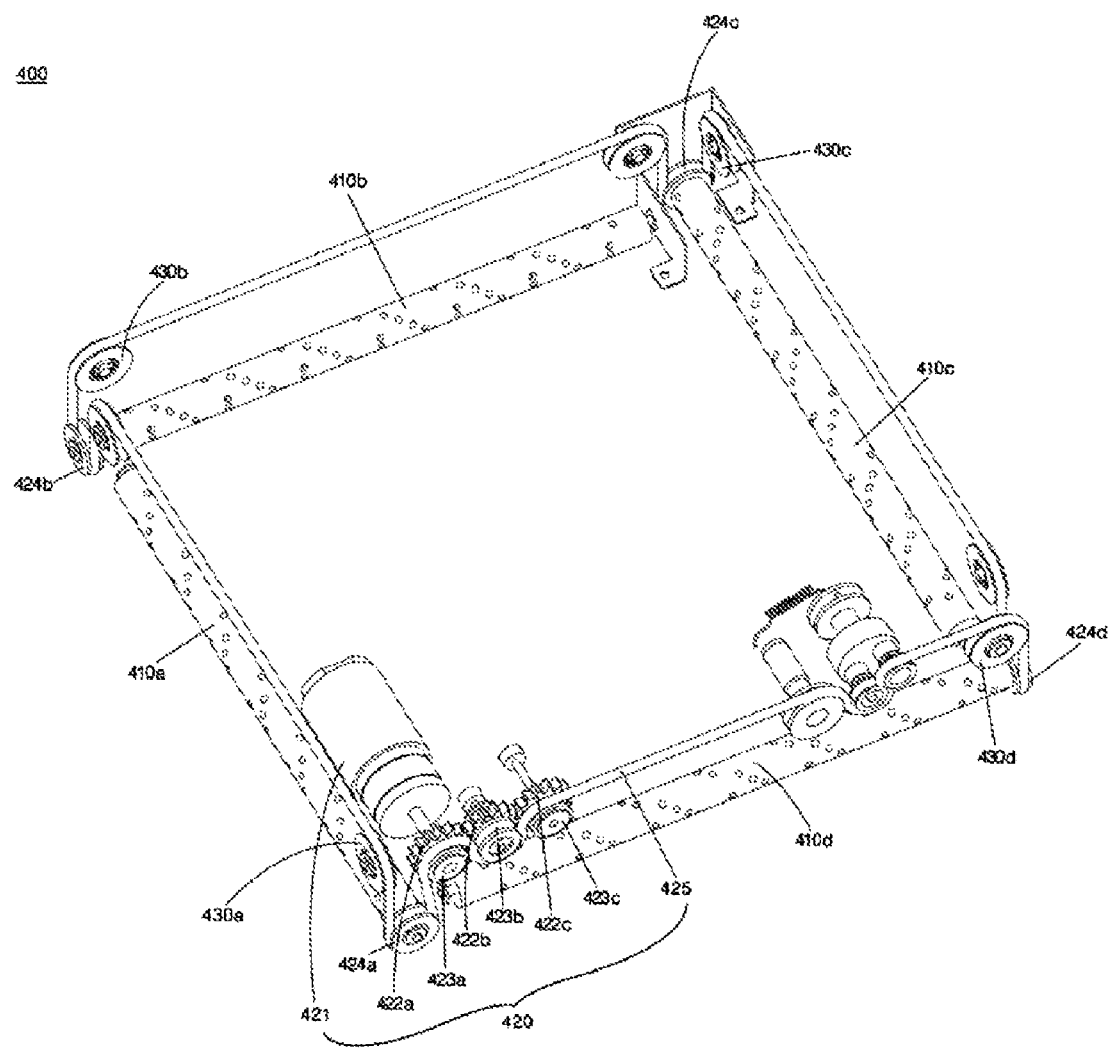
FIG. 5 is a perspective view illustrating the configuration of a cleaning unit according to a preferred embodiment of the present invention.

FIG. 5 is a perspective view illustrating the configuration of the cleaning unit according to a preferred embodiment of the present invention.

As shown in FIG. 5, the cleaning unit 400 includes cleaning brushes 410a to 410d mounted on the body 10 of the outer wall/window cleaning robot, and a cleaning brush driving unit 420 for rotating the cleaning brushes 410a to 410d. It is preferred that the cleaning brush driving unit 420 rotate the cleaning brushes 410a to 410d inwardly of the body 10, in order to collect, within the body 10, water used in a cleaning operation.

In a preferred embodiment, the cleaning brush driving unit 420 includes: a cleaning brush driving motor 421; a first gear 422a which rotates by the cleaning brush driving motor 421; a first belt-driving pulley 423a connected to a rotating shaft of the first gear 422a so as to be able to rotate along with the first gear 422a; a second gear 422b operatively connected to the first gear 422a so as to be able to rotate in accordance with the rotation of the first gear 422a; a second belt-driving pulley 423b connected to a rotating shaft of the second gear 422b so as to be able to rotate along with the second gear 422b; a third gear 422c operatively connected to the second gear 422b so as to be able to rotate in accordance with the rotation of the second gear 422b; and a third belt-driving pulley 423c connected to a rotating shaft of the third gear 422c so as to be able to rotate along with the third gear 422c. The cleaning brush driving unit 420 also includes brush pulleys 424a to 424d connected to respective rotating shafts of the cleaning brushes 410a to 410d, and a pulley belt 425 for transmitting a rotating force among the brush pulleys 424a to 424d. The cleaning brush driving unit 420 further includes direction-changing rollers 430a to 430d for changing the direction of the pulley belt 425, in order to transmit a rotating force between adjacent ones of the brush pulleys 424a to 424d, which have different rotating shaft extension directions.

In accordance with the above-described configuration, the cleaning unit 400 can not only collect, within the body 10, water used in a cleaning operation, without causing the water to be dropped to a lower story, but also clean all areas including a dead zone, because the four cleaning brushes 410a to 410, which are arranged along the periphery of the body 10, rotate inwardly of the body 10.

It is preferred that the pulley belt 425 be connected to the first to third belt-driving pulleys 423a to 423c in a crossing manner, in order to increase a frictional force of the pulley belt 425 on the first to third belt-driving pulleys 423a to 423c, and thus to more effectively transmit the rotating force.

It is also preferred that the cleaning unit 400 include a belt tension adjuster 440 for adjusting the tension of the pulley belt 425, in order to prevent the pulley belt 425 from being loosened, and thus to prevent the rotating force transmitted among the pulleys from being decreased.

Preferably, the outer wall/window cleaning robot of the present invention further includes a nozzle for injecting a cleaning liquid onto the cleaning brushes 410a to 410d and/or the outer wall, a drainer 450 for draining a liquid or dirt collected within the cleaning robot as the cleaning brushes 410a to 410d rotate inwardly of the cleaning robot, and seal members 460a and 460b respectively provided at outer and inner walls of the outer periphery of the body 10, to enable the liquid or dirt to flow effectively toward the drainer 450.

Hereinafter, the multi-hose cable 500, which is adapted to connect the cleaning robot to an external auxiliary device, will be described with reference to FIG. 6.

The multi-hose cable 500 includes: a water supply hose 510 connected to the nozzle for supplying a cleaning liquid to the cleaning robot; a draining hose 520 for draining along with dirt the liquid used in the cleaning operation and collected by the drainer 450; vacuum and pneumatic hoses 530 respectively connected to solenoid valves for supplying a vacuum and a pneumatic pressure to the cleaning robot; a power cable 540 for supplying electric power to the cleaning robot; and a sheath 550 surrounding the water supply hose 510, draining hose 520, vacuum and pneumatic hoses 530, and power cable 540.

Meanwhile, a multi-hose cable sensor (not shown) may be installed inside the outer wall of the cleaning robot, to recognize, as a cleaning start point, a region where the multi-hose cable 500 is bent. In this case, the robot can easily identify the cleaning start point, so that it can surely return to the cleaning start point after the completion of the cleaning operation.

The outer wall/window cleaning robot of the present invention can be connected to a fall-preventing safety device via the multi-hose cable 500. The fall-preventing safety device will be described in brief. The fall-preventing safety device includes a window frame engaging member which can rotate in vertical and horizontal directions, using a rotator, such that it can be aligned with the extension direction of the multi-hose cable 500. After the alignment, the window frame engaging member is engaged with a window frame, and is then fastened to the window frame by a fastening device. A large-size sucking pad may be used in place of the window frame engaging member. In this case, it is possible to install the fall-preventing safety device at a convenient place. During an operation of the safety device, the multi-hose cable 500 stops slowly in accordance with an operation of rotary damper rollers. Accordingly, it is possible to prevent impact from being abruptly applied to the multi-hose cable 500.

Meanwhile, since all elements of the auxiliary device have a small size, they can be mounted on the cleaning robot.

Although the preferred embodiments of the invention have been described with regard to a cleaning robot for cleaning the outer surface of a wall and/or window, it should be noted that the cleaning robot of the preferred embodiments can be applied for cleaning the inner surface of the wall and/or window.

As apparent from the above description, in accordance with the outer wall/window cleaning robot of the present invention, it is possible to prevent water used to clean the window or outer wall of a building from being dropped toward a lower story. Also, the cleaning robot can run smoothly, so that it can achieve a satisfactory cleaning operation without forming spots. The cleaning robot uses a turntable system, so that it can also freely change the movement direction thereof about the center thereof up to 360° without requiring any radius of rotation, to easily approach even a dead zone. Accordingly, the cleaning robot can achieve a perfect cleaning operation. The cleaning robot has a minimum size and a minimum weight, so that it can minimize the possibility that the cleaning robot falls off and down during cleaning operation.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A robot for cleaning a wall and/or window, comprising:
    a moving unit for moving the robot in a first direction;
    a direction changing unit for rotating the moving unit to change a moving direction of the robot; and
    a cleaning unit mounted on peripheral area of the robot.

2. The robot according to claim 1, wherein the moving unit comprises:
    a plurality of moving members that can linearly move in a second direction opposite to the first direction;
    moving member rails for guiding the linear movement of the plurality of moving members, respectively;
    a moving member driving unit for driving the plurality of moving members; and
    suction units attached to the plurality of moving members respectively for supporting the robot onto the outer wall/window.

3. The robot according to claim 2, wherein the moving unit further comprises:
    moving member sensors mounted on the moving member rails respectively for sensing linear movement of the corresponding moving member.

4. The robot according to claim 2, wherein the moving unit further comprises:
    moving member returning units for returning to an original position the moving members having moved linearly in the second direction by a predetermined distance.

5. The robot according to claim 4, wherein each of the moving member returning units comprises a pneumatic cylinder or a coil spring.

6. The robot according to claim 2, wherein the moving member driving unit comprises:
    a moving member driving motor;
    a shaft rotatably connected to the moving member driving motor;
    rack gears connected to the plurality of moving members respectively; and
    plate cam gears,
    wherein the shaft passes through centers of curvature of the plate cam gears, and the plate cam gears rotate in accordance with rotation of the shaft so as to linearly move the rack gears respectively.

7. The robot according to claim 6, wherein the shaft has a polygonal cross-section.

8. The robot according to claim 7, wherein the shaft passes through the centers of curvature of the plate cam gears in such a way that each of the plate cam gears is misaligned with one another by a predetermined angle.

9. The robot according to claim 6, wherein each plate cam gear has a sector shape, the plate cam gear has a geared portion at an arc of the sector shape, and the length of the arc corresponds to a length for which the corresponding moving member moves linearly in the second direction such that the corresponding moving member rail is moved toward the outer wall/window when the corresponding moving member starts to move linearly in the second direction.

10. The robot according to claim 9, wherein the moving member driving unit further comprises elastic members for returning to an original position the moving member rail having moved toward the outer wall/window when the moving member completes the linear movement in the second direction.

11. The robot according to claim 2, wherein each of the suction units comprises a moving vacuum pad having an oval shape with a longer axis thereof parallel to the first and second directions.

12. The robot according to claim 1, wherein the position-fixing driving unit further comprises:
a rotary damper gear for transmitting a rotating force from the position-fixing drive motor to the first female spur gear while preventing the position-fixing drive motor from being overloaded.

13. The robot according to claim 1, wherein the direction setting unit comprises:
a circular moving unit supporting member for supporting the moving unit; and
a direction-setting driving unit for rotating the moving unit supporting member.

14. The robot according to claim 13, wherein the direction-setting driving unit comprises:
a direction-setting drive motor;
a worm rotating by means of the direction-setting drive motor; and
a worm gear mounted on an outer circumferential surface of the moving unit supporting member, the worm gear being engaged with the worm such that the worm gear rotates in accordance with the rotation of the worm, thereby rotating the moving unit supporting member.

15. The robot according to claim 1, wherein the cleaning unit comprises:
a first cleaning brush mounted on a first inner side portion of the robot; and
a cleaning brush driving unit for rotating the first cleaning brush inwardly of the robot so as to allow water used in a cleaning operation to be collected within the robot.

16. The robot according to claim 15, wherein the cleaning brush driving unit comprises:
a cleaning brush driving motor;
a first gear rotating in a first rotation direction by means of the cleaning brush driving motor;
a first belt-driving pulley connected to a rotating shaft of the first gear so as to be able to rotate in the first rotation direction together with the first gear;
a first brush pulley connected to a rotating shaft of the first cleaning brush; and
a pulley belt for transmitting a rotating force of the first belt-driving pulley to the first brush pulley.

17. The robot according to claim 16, wherein the cleaning brush driving unit further comprises:
a second gear engaged with the first gear and rotating in a second rotation direction opposite to the first rotation direction;
a second belt-driving pulley connected to a rotating shaft of the second gear so as to be able to rotate in the second rotation direction together with the second gear;
a third gear engaged with the second gear so as to be able to rotate in the first rotation direction; and
a third belt-driving pulley connected to a rotating shaft of the third gear so as to be able to rotate in the first rotation direction together with the third gear.

18. The robot according to claim 17, wherein the pulley belt is connected to the first, second, and third belt-driving pulleys in a crossing manner.

19. The robot according to claim 16, wherein the cleaning unit further comprises:
a second cleaning brush mounted on a second inner side portion of the robot;
a second brush pulley connected to a rotating shaft of the second cleaning brush; and
a direction-changing roller positioned between the first and second brush pulleys for changing an extension direction of the pulley belt so that the pulley belt transmits the rotating force of the first belt-driving pulley to the second brush pulley.

20. The robot according to claim 16, wherein the cleaning unit further comprises:
a belt tension adjuster for adjusting a tension of the pulley belt.

21. The robot according to claim 1, further comprising:
a multi-hose cable connected to an external auxiliary device, the multi-hose cable comprising:
a water supply hose for supplying a cleaning liquid to the robot;
a draining hose for draining along with dirt the liquid used in the cleaning operation from the robot;
vacuum and pneumatic hoses for supplying a vacuum and a pneumatic pressure to the robot, respectively;
a power cable for supplying electric power to the robot; and
a sheath surrounding the water supply hose, the draining hose, the vacuum and pneumatic hoses, and the power cable.

* * * * *